D. LIBBY, Jr.
OPERATING MEANS FOR GATE VALVES.
APPLICATION FILED OCT. 11, 1909.
954,446.
Patented Apr. 12, 1910.
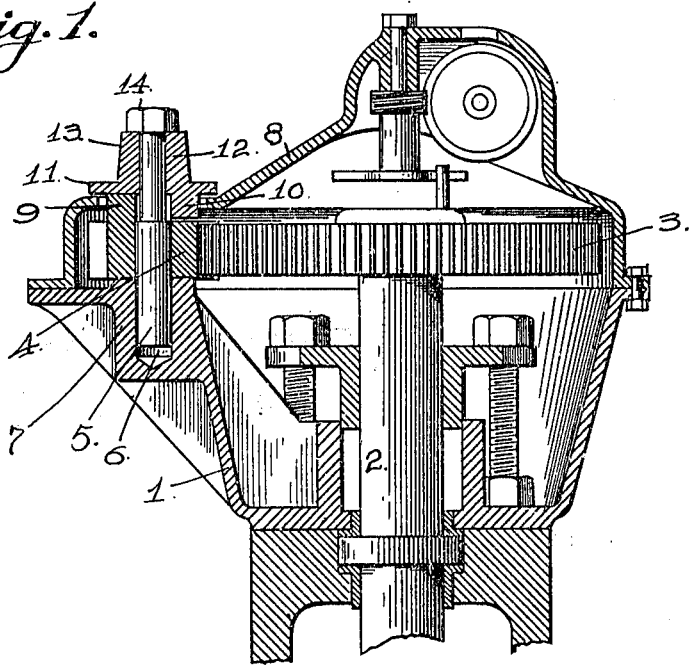
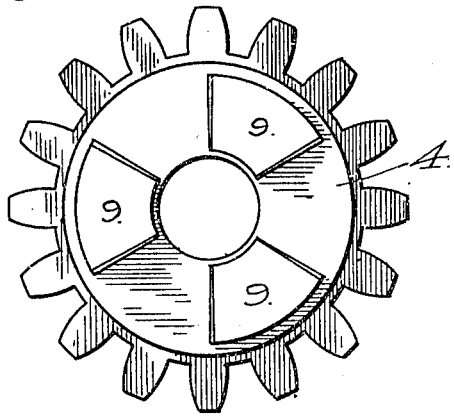
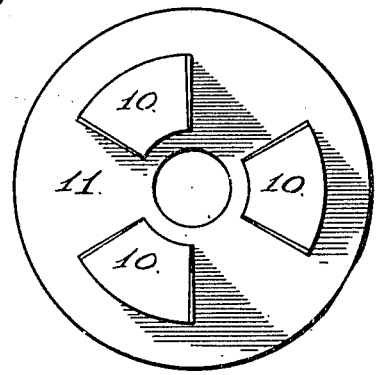
Witnesses.
Arthur L. Slee.
S. Cristine
Inventor.
Sorrell Libby, Jr.
by N. A. Acres
his atty.

UNITED STATES PATENT OFFICE.

DORVILLE LIBBY, JR., OF SAN FRANCISCO, CALIFORNIA, ASSIGNOR TO THE PELTON WATER WHEEL COMPANY, OF SAN FRANCISCO, CALIFORNIA, A CORPORATION OF CALIFORNIA.

OPERATING MEANS FOR GATE-VALVES.

954,446.  Specification of Letters Patent.   Patented Apr. 12, 1910.

Application filed October 11, 1909. Serial No. 522,044.

*To all whom it may concern:*

Be it known that I, DORVILLE LIBBY, Jr., a citizen of the United States, residing in the city and county of San Francisco and State of California, have invented certain new and useful Improvements in Operating Means for Gate-Valves, of which the following is a specification.

The hereinafter described invention relates to an improved means for transmitting rotary motion to the valve stem for opening and closing the valve disk or valve mechanism of a gate valve of a water supply system, and more particularly the gate valves employed in connection with high pressure hydrants of a city's water supply for fire protection; the object of the invention being to simplify the construction of the operating means for controlling the movement of the valve stem, to permit of a greater pressure being applied thereto, for actuating the same, and to increase the speed of rotation of the said stem so as to impart a quick opening and closing movement to the valve disk or valve mechanism of the gate valve.

To comprehend the invention reference should be had to the accompanying sheet of drawings, wherein—

Figure 1 is a broken sectional view of the upper portion of a valve casing, disclosing the valve stem rotatably held therein, and the means for imparting rotation thereto. Fig. 2 is a detail top plan view of the pinion for engaging with and actuating the gear secured to the valve stem. Fig. 3 is a bottom plan view of the drive nut which interlocks with and operates the pinion meshing with the gear of the valve stem.

In the drawings, the numeral 1 is used to indicate the upper portion or bonnet section of the valve casing, and 2 the valve stem rotatably held thereon. On the upper or outer end of the valve stem 2 is securely mounted a gear 3, which gear is engaged and driven by means of an intermeshing pinion 4, located at one side of the gear 3. The pinion 4 is loosely mounted for rotation on a fixed stud 5, rigidly secured, in any suitable manner, within a socketed seat 6, formed in an enlarged portion 7 of casing section 1, which casing section is closed by the cap or cover 8 bolted thereto. On the upper surface of the pinion 4 is formed a series of projections or lugs 9, preferably located an equi-distance apart, and between these projections or lugs fit the projections or lugs 10, depending from the under face of the drive nut or bushing 11, which drive nut works on the outer surface of the cap or cover 8. The said drive nut is loosely mounted for rotation on the projecting portion of the stud 5, and the bearing hub 12 of the drive nut is tapered upwardly and formed with flattened faces 13, to receive a key for imparting rotation thereto. The drive nut 11 is thus in locked engagement with the pinion 4, being held thereto by the securing nut 14, screwed onto the threaded end of the stud 5.

As the drive nut 11 is turned, its movement is imparted to the pinion 4, which in turn transmits rotation to the gear 3, for actuating the valve stem 2 to raise and lower the valve disk or valve mechanism, not shown, the movement of which may be increased or decreased in accordance with the speed of rotation given to the drive nut 11.

An exceedingly simple, inexpensive, efficient and durable drive means for imparting rotation to the valve stem is thus provided, and by means of which expensive machine work may be dispensed with.

Having thus described the invention what is claimed as new and desired to be secured by Letters Patent is:—

1. The means for actuating the valve or valve mechanism of a valve casing, the same consisting of a valve stem movably held within the casing, a gear mounted thereon, a pinion meshing with said gear loosely mounted on a fixed stud, a drive nut loose on said stud and held in locked engagement with the pinion, and a tapering bearing hub extended from the drive nut for receiving a key to actuate the same.

2. The means for actuating the valve or valve mechanism of a valve casing, the same comprising a valve stem rotatably held within the casing, a gear mounted thereon, a pinion meshing with said gear loosely mounted on a fixed stud, a series of projections on the upper face of said pinion, a drive nut loose on said stud for operating the pinion, a series of projections extended therefrom for engaging with the face of the said pinion so as to interlock therewith, and a tapering bearing hub extended from the drive nut for receiving a key to actuate the same.

3. The combination with a valve casing, of a pinion loosely mounted on a fixed stud within the upper portion of the valve casing, a drive nut loose on said stud held in locked engagement with the pinion, a tapering bearing sleeve or hub extended from the drive nut for receiving a key to actuate the same, the drive nut being operated from the outside of the valve casing.

4. The combination with a valve casing, of a valve stem movably held therein, a gear secured thereon, a pinion in mesh therewith, a fixed stud on which the pinion is loosely mounted, and a drive nut loose on said stud and held in locked engagement with the pinion.

In testimony whereof I have signed my name to this specification in the presence of two subscribing witnesses.

DORVILLE LIBBY, Jr.

Witnesses:
N. A. ACKER,
D. B. RICHARDS.